Aug. 27, 1968  D. SCIAKY  3,399,289
ELECTRODE HOLDER FOR RESISTANCE WELDER
Filed Oct. 29, 1964  2 Sheets-Sheet 2

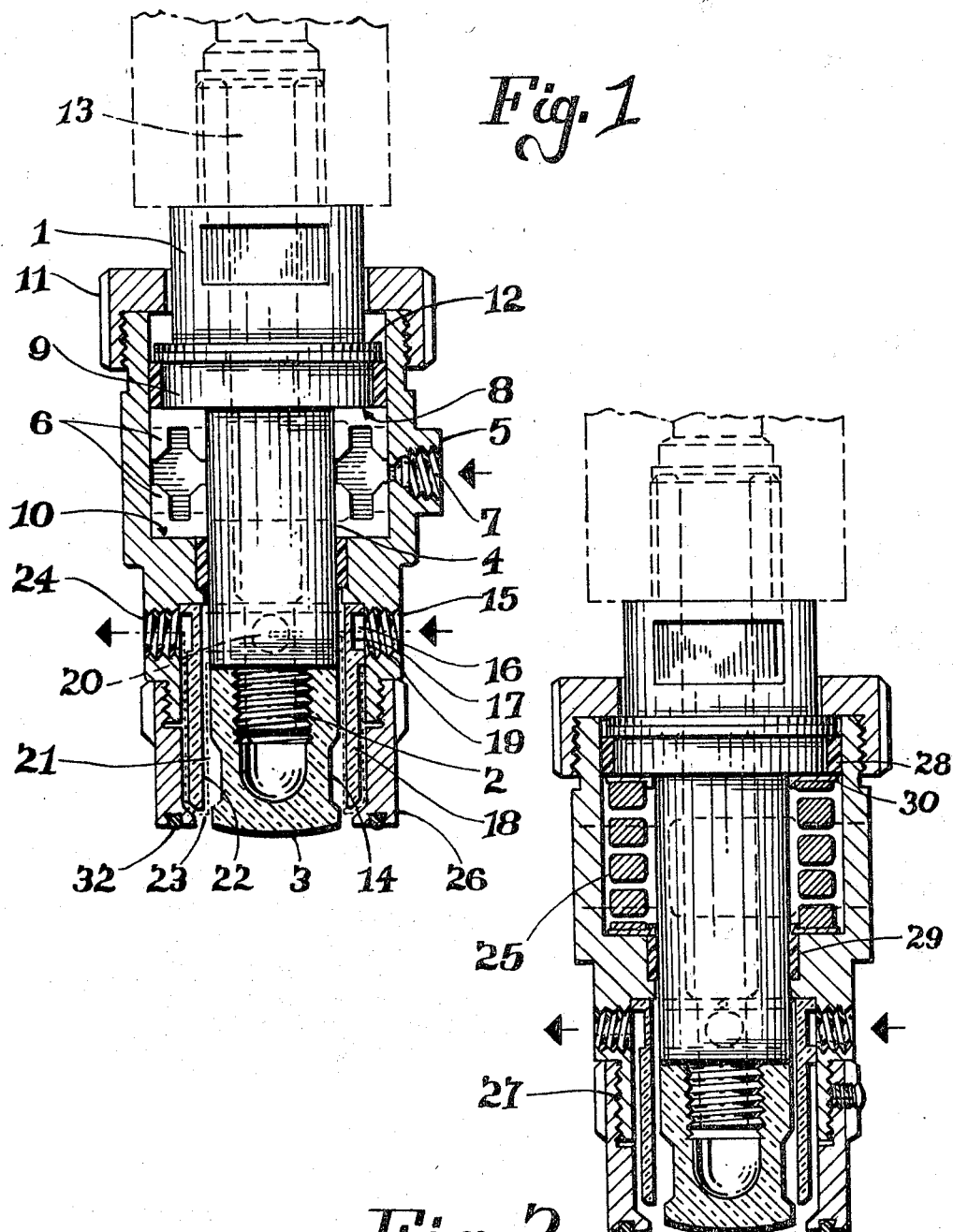

INVENTOR.
David Sciaky

United States Patent Office 3,399,289
Patented Aug. 27, 1968

3,399,289
ELECTRODE HOLDER FOR
RESISTANCE WELDER
David Sciaky, Chicago, Ill., assignor to Welding Research, Inc., Chicago, Ill., a corporation of Illinois
Filed Oct. 29, 1964, Ser. No. 407,465
10 Claims. (Cl. 219—86)

ABSTRACT OF THE DISCLOSURE

A method and apparatus for resistance welding of planar sheets by the direct-weld type which utilizes a pair of slideable electrodes disposed on each side of the sheets. Electrode holders incorporate either hydraulic or spring means for applying an adjustable force to the sheets over the entire surface of an annular area around the tip of each electrode so as to restrain the sheets from separating around the weld. Electrical insulation means are arranged in relation to the electrode so as to prevent welding current from flowing through the adjustable force means to the sheets. A cooling fluid is circulated about the outer surface of the electrode tips between the adjustable force means and the electrode tip. The adjustable force means includes a sealing means in contact with the sheets for preventing escape of the cooling fluid. A means is provided for adjusting the distance that the electrode tip is recessed within the adjustable force means.

---

This invention relates to holders for electrode tips as used in the resistance welding process.

In resistance welding of heavy gauge titanium and other materials above 1/8" thickness with the use of conventional electrode holders and electrode tips it has been found that during the resistance welding process the heating of the weld nugget causes extrusion of the plastic material around the periphery of the weld nugget being formed. This extruded material causes sheet separation around the welded area with a consequent lessening of the fatigue strength of the welded joint.

The present invention has for its object a means of applying a force against the two sheets to be welded a short distance outside the weld nugget being formed in order to prevent sheet separation.

Another object is to provide a seal between the means used for applying the force and the sheets being welded in order to prevent leakage of the cooling medium onto the sheets.

Another object is to provide a device which is compact and so arranged that it allows for close spacing of welds.

Another object is to provide a means for holding the sheets being welded which is insulated from the electrode tips that carry the welding current.

Another object of the invention is to provide an electrode which is water-cooled outside the electrode as well as inside the electrode.

Another object is to provide an electrode tip which will have long tip life.

Another object is to provide an electrode in which the tendency to form an annular dimple on the surface of the material being welded at the point of application of the electrode tip is reduced.

Another object is to provide means for adjusting the annular hold down force to a desired level to make up for electrode tip wear.

FIG. 1 illustrates one embodiment of the invention which utilizes hydraulic force to produce the annular holding down force;

FIG. 2 is a modification which shows the use of a spring as the force producing means for the annular hold down pressure ring;

Figure 3:
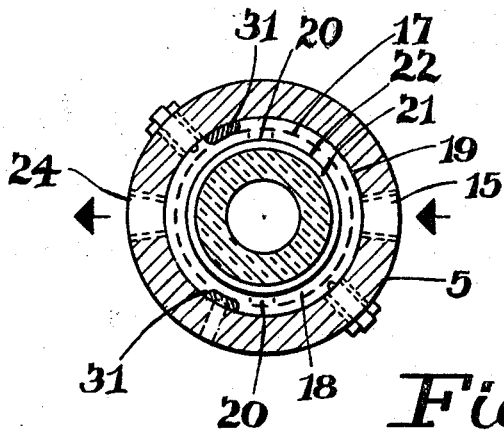
FIG. 3 is a plan view of the electrode showing the path taken by the cooling fluid.

Referring to FIG. 1, an electrode shank 1 is provided with a threaded section 2 to which the electrode tip 3 may be fastened. Surrounding the reduced diameter section of the electrode shank 4 is an annular body 5 which provides a passageway for the water which is to cool the exterior of the tip 3 and a second sealed-off passageway for the application of hydraulic fluid at a predetermined pressure which is to provide the hold down force. The seals 6 form a small chamber connected with threaded opening 7 to which hydraulic fittings may be applied for connection to a suitable hydraulic pump. The introduction of the fluid under pressure into this chamber will create force between wall 8 on the flange 9 of the electrode shank 1 and wall 10 on the annular body 5. This force will cause body 5 to move downward with respect to the electrode shank 1 until restrained by the retaining nut 11 striking the insulating washer 12.

The electrode tip 3 is cooled inside the tip through a hole 13 which extends through the electode shank and into the electrode tip. The outer surface 14 of the electrode tip is cooled by water entering the threaded opening 15. The water flows through an annular ring 16 formed by a section of the outer wall 17 of the element 18 and the inner wall 19 of the body 5. The water is prevented from flowing directly out through outlet port 24 by the barriers 31 shown in FIG. 3. The water flows through two holes 20 in element 18 diametrically opposite each other, thus entering the channel 21 which is between the electrode tip and the inner wall 22 of element 18. The water flows along the path shown by the dotted line 23 and out through the threaded exit port 24. Sufficient water is circulated through this passageway in order to maintain the tip at a low enough temperature to prevent softening and subsequent deformation of the tip. An O-ring or other suitable seal 32 is provided to prevent water from leaking onto the surface of the metal being welded.

FIG. 2 illustrates the modification wherein spring 25 is utilized to provide the hold down force. The spring is given a pre-load force by retaining nut 11. The pressure ring 26 is adjusted by means of the threaded portion 27 with the electrode in the relaxed position so that the electrode lies a predetermined distance, say 1/16" within the hold down ring. When the electrode force is applied to the electrode shank 1, force will be applied through the spring 25 until the outer ring applies the preload force to the work. Further application of electrode force to the electrode shank produces the tip force between the sheets being welded. In order to insure that current will not flow through the body 5, insulating rings 28, 29 and 30 are provided. Rings 28 and 29 further provide bearings which have the further function of maintaining the body 5 and the electrode shank 1 in concentric relationship.

FIG. 3 is a plan view of the electrode showing the path taken by the cooling fluid. Water enters through the port 15 indicated by the arrow at the left, circulates between the inner wall 19 of the body 5 until the obstruction 31 is reached, passes through the holes 20 in separator element 18, enters channel 21 which is between the electrode tip and the inner wall 22 of element 18, and exits through port 24.

Figure 4:
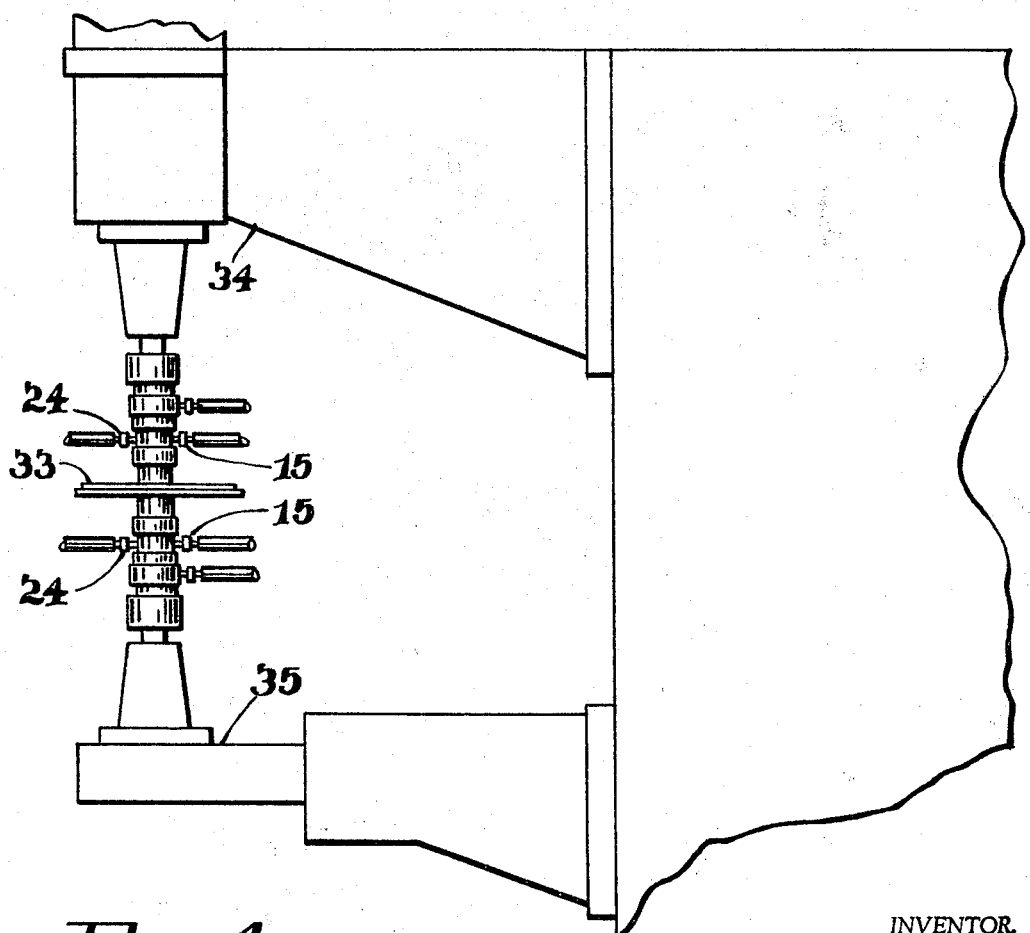
FIG. 4 shows the application of the invention to a resistance welding machine.

FIG. 4 shows the installation of the electrode holder on a resistance welding machine. The sheets being welded, 33, are shown clamped between two identical electrode holders which are fixed to the upper and lower arms, 34 and 35 respectively, of the resistance welding machine.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:

1. An apparatus for resistance welding of planar sheets comprising a pair of slideable electrodes disposed on each side of the said sheets, means actuated by hydraulics for applying an adjustable force to the sheets over the entire surface of an annular area around the tip of each electrode so as to restrain the sheets from separating around the weld, electrical insulation arranged so as to prevent welding current from flowing through said means for applying the adjustable force to the sheets, means for circulating a cooling fluid about the outer surface of the tip of each electrode and the enclosed area between the electrode and aforesaid means for applying the force on the sheets, sealing means in association with the forces applying means for preventing the escape of the cooling fluid while the force is applied to the sheets, and means for adjusting the distance that the electrode tip is recessed into the means used for restraining the sheets being welded.

2. An apparatus for resistance welding of planar sheets comprising a pair of slideable electrodes disposed on each side of the said sheets, means for applying an adjustable force to the sheets over the entire surface of an annular area around the tip of each electrode so as to restrain the sheets from separating around the weld, electrical insulation for preventing welding current from flowing through said means for applying the adjustable force to the sheets and means for circulating a cooling fluid about the outer surface of the tip of each electrode and the enclosed area between the electrode and said means for applying the force to the sheets.

3. Apparatus as in claim 2, including means for circulating a cooling fluid inside the tip of each electrode.

4. Apparatus, as in claim 2, including hydraulic means for applying an adjustable force to the sheets over a whole surface of an annular area around the tip of each electrode so as to restrain the sheets from separating around the weld.

5. Apparatus, as in claim 2 in which the means for applying an adjustable force include spring means.

6. Apparatus, in accordance with claim 2, including means for adjusting the force which restrains the sheets from separating.

7. Apparatus as described in claim 2 including means for adjusting the distance the electrode tip is recessed into the means used for restraining the sheets being welded.

8. Apparatus as described in claim 2 including sealing means for preventing the flow of water onto the sheets outside of the annular area between the electrode tip and the means for applying the force to the sheets.

9. A method of direct resistance welding of planar sheets, utilizing a separate, slideable electrode on each side of the sheets, including the steps of applying an adjustable force to the sheets over the whole surface of an annular area of each of the aforesaid electrodes so as to restrain the sheets from separating around the weld, passing welding current through the electrodes and sheets while preventing current from flowing through the means for applying aforesaid adjustable force to the sheets, and circulating a cooling fluid in the enclosed space between the outer surface of the electrodes and the means for applying the above mentioned adjustable force.

10. A method of direct resistance welding of planar sheets utilizing a separate, slideable electrode on each side of the sheets including the steps of applying a predetermined force over the entire surface of an annular area close to and surrounding the tip of each electrode so as to restrain the sheets from separating around the weld, passing welding current through the electrodes and sheets while preventing current from flowing through the means for applying aforesaid predetermined force to the sheets, circulating a cooling fluid inside the electrode tip and through the enclosed space bounded by the outer surface of the slideable electrodes, the inner surface of the means for applying the adjustable force and the surface on the sheets between the electrode tip and the inside of the aforementioned annular area over which the force is applied to the sheets.

References Cited

UNITED STATES PATENTS

| | | | |
|---|---|---|---|
| 1,237,915 | 8/1917 | Lachman | 219—86 |
| 1,287,376 | 12/1918 | MacLennan | 219—86 |
| 2,001,688 | 5/1935 | Paugh | 219—86 |
| 2,024,239 | 12/1935 | McBain | 219—86 |
| 2,194,573 | 3/1940 | Schulz | 219—86 |
| 2,434,025 | 1/1948 | Wallace | 219—86 |
| 3,070,686 | 12/1962 | Vinson et al. | 219—117 |
| 3,119,007 | 1/1964 | Kreiter et al. | 219—91 |
| 2,045,523 | 6/1936 | Fassler | 219—86 |
| 2,389,946 | 11/1945 | Wilser | 219—120 |
| 2,392,736 | 1/1946 | Hensel et al. | 219—120 |
| 2,491,479 | 12/1949 | Dash | 219—48 |
| 2,734,980 | 2/1956 | Millenson | 219—86 |
| 2,797,303 | 6/1957 | Kershaw | 219—78 |
| 3,036,198 | 5/1962 | Grinland et al. | 219—78 |
| 3,089,020 | 5/1963 | Hurlebaus | 219—86 |
| 3,089,947 | 5/1963 | Frungel | 219—107 |
| 3,235,704 | 2/1966 | Rockwell | 219—86 |

FOREIGN PATENTS

| | | |
|---|---|---|
| 458,197 | 12/1936 | Great Britain. |

RICHARD M. WOOD, *Primary Examiner.*

W. D. BROOKS, *Assistant Examiner.*